No. 740,863. PATENTED OCT. 6, 1903.
L. P. JACOBS.
RATCHET LEVER.
APPLICATION FILED APR. 15, 1903.
NO MODEL.
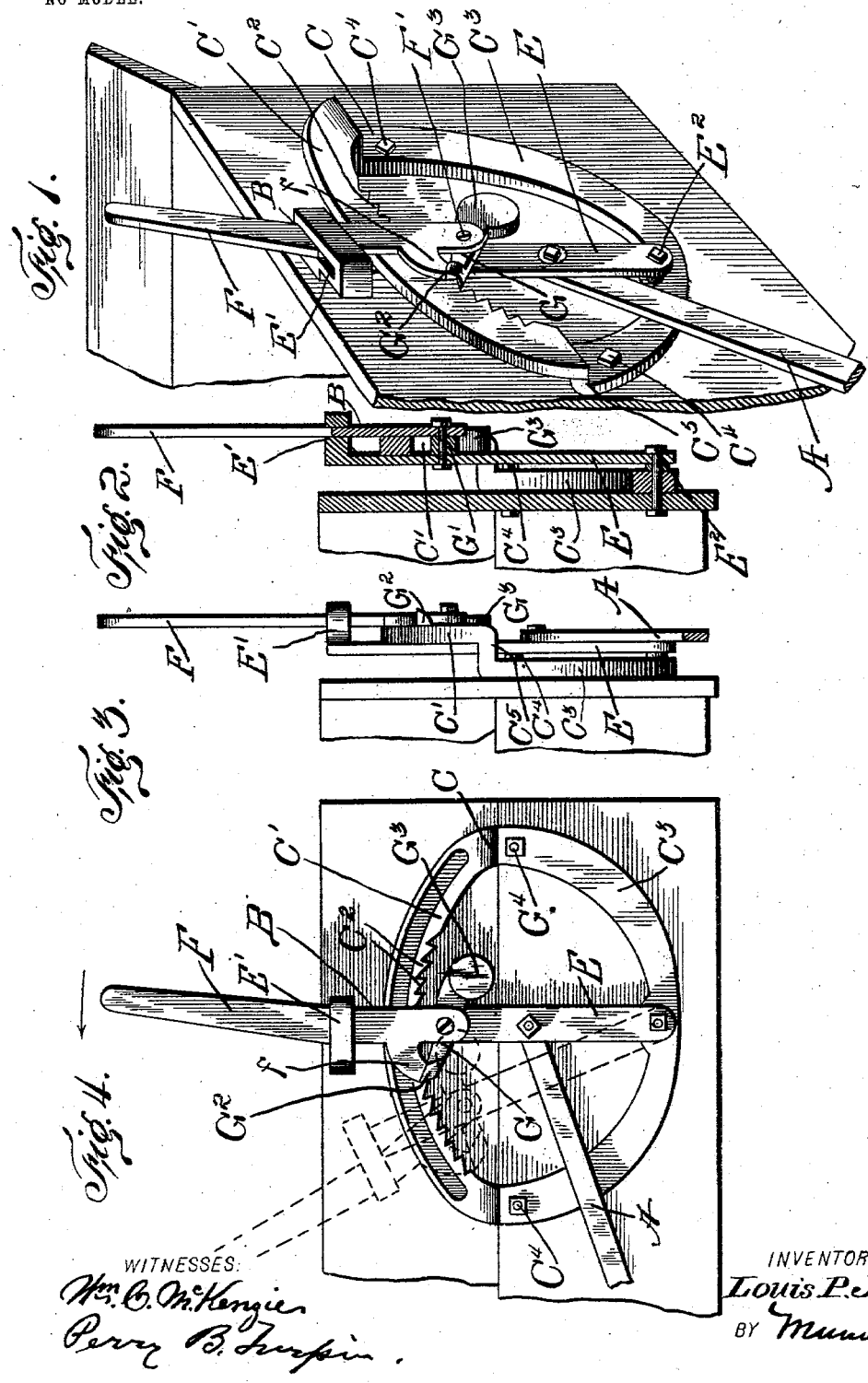
WITNESSES:
Wm. C. McKenzie
Perry B. Turpin
INVENTOR
Louis P. Jacobs
BY Munn & Co.
ATTORNEYS.

No. 740,863. Patented October 6, 1903.

UNITED STATES PATENT OFFICE.

LOUIS PHILIPP JACOBS, OF EARLING, IOWA.

RATCHET-LEVER.

SPECIFICATION forming part of Letters Patent No. 740,863, dated October 6, 1903.

Application filed April 15, 1903. Serial No. 152,691. (No model.)

*To all whom it may concern:*

Be it known that I, LOUIS PHILIPP JACOBS, a citizen of the United States, residing at Earling, in the county of Shelby and State of Iowa, have made certain new and useful Improvements in Ratchet-Levers, of which the following is a specification.

My invention is an improvement in ratchet-levers especially designed for use in connection with wagon-brakes; and the invention has for an object to provide a novel construction of ratchet-lever whereby the initial movement of the lever toward the released position will operate automatically to release the dog from the rack-segment, thus dispensing with the necessity of separate devices on the handle of the lever for releasing the dog before the lever can be moved to released position; and the invention consists in certain novel constructions and combinations of parts, as will be hereinafter described and claimed.

In the drawings, Figure 1 is a perspective view of my invention as in use. Fig. 2 is a detail vertical section thereof. Fig. 3 is an end view, and Fig. 4 is a side view of a device embodying my invention.

The invention is shown as embodied in a device designed especially for use in connection with wagon-brakes and in which the rod A is designed to connect the lever B with the brake devices.

The rack-segment C has the curved rack-bar C', provided with the ratchet-teeth $C^2$, and the body-plate $C^3$, which may be bolted at $C^4$ securely to the wagon-body or other suitable support. The rack-bar C' is offset by means of the connecting-lugs $C^5$ from the body-plate $C^3$ to afford room between the rack-bar C' and the wagon-body or other support for the play of the main section of the lever.

The lever is made in two sections E and F, the former being the main section and the latter being the handle-section and being pivoted at F'' to the main section at a point between the ends of the latter and having a limiting rocking movement on said pivot F'', controlled by the loop or keeper E' on the main section E, as shown. The main section E is pivoted at its lower end at $E^2$ to the main plate $C^3$ and extends thence upwardly along the inner side of the rack-bar C' and is provided at its upper end above the said rack-bar with the loop or boxing E', which projects forwardly in advance of the rack-bar C' and is elongated slightly in the direction of the said rack-bar, as shown. This construction brings the loop E' to the plane outside of that of the rack-bar, as clearly shown in Fig. 2, so it can receive the handle-section F of the lever, which latter extends outside of the rack-bar and is pivoted at its lower end at F'' in connection with the main section and extends thence upwardly through the loop E'.

The dog G is pivoted at G', preferably in connection with the main section of the lever, and is provided at one end with the pawl-point $G^2$ to engage the teeth of the rack-bar C', such point being held normally in engagement with the teeth by weighting the other end of the dog at $G^3$, as shown. The dog is preferably pivoted concentrically with the handle-section F of the lever, so the dog and lever will move in the same arc, and the section F is provided with an arm or projection *f* in position to engage the point end of the pawl when the handle-section is moved from the position shown in full lines, Fig. 4, to that indicated in dotted lines, same figure, to free the dog from engagement with the teeth of the rack-bar C' when the lever-section F is rocked from its position shown in Fig. 4, wherein it lies in the right-hand end of the loop E', to the opposite end of the loop in the initial movement of releasing the brake.

It will be understood that the dog lies between the main section E of the lever and the handle-section of such lever and spaces the same properly apart, so they can operate on opposite sides of the rack-bar, as shown in Figs. 1, 2, and 3 of the drawings.

By my invention it will be noticed I provide means by which the farmer or teamster can release his brake without the necessity of providing any attachment to the upper part of the lever upon which to press to release the dog, which holds the brake set, and so construct the lever that it alone operates to set or release the brake.

In operation the pushing of the lever forward will set the brake, and the dog by engaging the teeth of the rack-bar will hold the brake set. If now it is desired to release the brake, it is only necessary to pull the handle-section F of the brake-lever in the direction indicated by the arrow in Fig. 4, which operation will first release the dog G from the rack-bar, when the brake-lever can be pulled back to release the brake. If it is found that the brake has been set too hard, it is only necessary to move the lever back a notch or two and release the handle-section, when the dog will engage with the proper notch, it being understood that the strain of the brake will tend to operate on the main section of the lever in such manner as to set the brake if the handle-section be pulled back slightly and then released.

Having thus described my invention, what I claim as new, and desire to secure by Letters Patent, is—

1. The improvement in wagon-brakes herein described, consisting of the frame having the main plate, the curved rack-bar, and the devices connecting said plate and bar whereby the rack-bar is offset from the main plate, the lever consisting of the main section pivoted at its lower end to the main plate, and extending along one side of the rack-bar and above the same and provided above the rack-bar with a forwardly-projecting loop elongated in the direction of length of the rack-bar, the handle-section extending through and operating in said loop, and pivoted at its lower end in connection with the main section of the lever, and the dog arranged between the main section of the lever and the handle-section, and pivoted concentrically with the handle-section of the lever, the handle-section of the lever being provided with a projecting arm or portion by which to engage the dog to release the same from engagement with the rack-bar, substantially as and for the purpose set forth.

2. The combination substantially as herein described, of the rack-bar, the dog arranged for engagement therewith, and the main lever consisting of a main section having an elongated loop, and the handle-section having a limited movement in said loop independent of the main section and arranged to release the dog from engagement with the rack-bar, the loop of the main section being elongated in the direction of the arc traveled by the lever, substantially as set forth.

3. The combination with the rack-bar, of the lever composed of a main section and a handle-section pivoted to the main section below the rack-bar and having a movement independent of the main section, means above the rack-bar for limiting such movement and the dog arranged to engage the rack-bar and to be released by the handle-section, substantially as set forth.

4. The combination with the rack-bar and the dog for engagement therewith, of the lever comprising the pivoted main section, the handle pivoted to the main section and having a projecting arm arranged to engage the point of and release the dog and devices on the main section for limiting the movement of the handle-section on its pivot, whereby the handle-section may be operated to release the dog and then to swing the main section of the lever, substantially as set forth.

5. The combination of the rack-bar, the main lever-section, the handle lever-section pivoted to the main section and provided with means for releasing the dog, the dog and a loop on the main section above the rack-bar for limiting the independent movement of the handle-section, substantially as set forth.

6. A brake-lever device, comprising a main lever-section having a loop at its upper end to receive the handle-section, the handle-section pivoted below said loop in connection with the main section and having an independent movement in and limited by said loop, and the dog carried by the lever and arranged to be released by the handle-section of the lever, substantially as set forth.

7. The combination of the rack-bar, the lever composed of the main section and the handle-section having a limited movement independent of the main section, and provided with an arm or projection for engagement with the point of the dog for releasing the same, and the dog arranged below said arm or projection and in position for engagement thereby, substantially as set forth.

LOUIS PHILIPP JACOBS.

Witnesses:
F. N. WERRESDING,
F. A. JACOBS.